United States Patent
Lee et al.

(10) Patent No.: US 12,555,845 B2
(45) Date of Patent: Feb. 17, 2026

(54) BATTERY MODULE, BATTERY PACK INCLUDING BATTERY MODULE, AND VEHICLE INCLUDING BATTERY PACK

(71) Applicants: Hyundai Motor Company, Seoul (KR); Kia Corporation, Seoul (KR)

(72) Inventors: Gungoo Lee, Suwon-si (KR); Jonggu Lee, Seoul (KR); Junsu Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 634 days.

(21) Appl. No.: 17/974,267

(22) Filed: Oct. 26, 2022

(65) Prior Publication Data

US 2024/0021911 A1    Jan. 18, 2024

(30) Foreign Application Priority Data

Jul. 13, 2022    (KR) .................. 10-2022-0086121

(51) Int. Cl.
  *H01M 10/6556* (2014.01)
  *H01M 10/613* (2014.01)
  *H01M 10/625* (2014.01)

(52) U.S. Cl.
  CPC ..... *H01M 10/6556* (2015.04); *H01M 10/613* (2015.04); *H01M 10/625* (2015.04); *H01M 2220/20* (2013.01)

(58) Field of Classification Search
  CPC ........... H01M 10/6556; H01M 10/613; H01M 10/625; H01M 2220/20; H01M 50/204; H01M 10/6555; H01M 10/6568; H01M 50/249; Y02E 60/10
  See application file for complete search history.

(56) References Cited

U.S. PATENT DOCUMENTS

| | | | | |
|---|---|---|---|---|
| 2010/0297486 A1* | 11/2010 | Fujii | ............... | H01M 10/651 |
| | | | | 429/120 |
| 2011/0104547 A1* | 5/2011 | Saito | ............... | H01M 10/6557 |
| | | | | 429/120 |
| 2011/0104548 A1* | 5/2011 | Saito | ............... | H01M 10/6563 |
| | | | | 429/120 |
| 2011/0244293 A1* | 10/2011 | Khalighi | ........ | H01M 10/486 |
| | | | | 429/120 |
| 2020/0161728 A1* | 5/2020 | Wang | ............. | H01M 10/6554 |
| 2024/0250345 A1* | 7/2024 | Lee | ................ | H01M 10/647 |

FOREIGN PATENT DOCUMENTS

| | | | | |
|---|---|---|---|---|
| CN | 111799409 A | | 10/2020 | |
| DE | 102012222635 A1 * | | 6/2014 | ...... B60H 1/00278 |
| EP | 2323196 A1 | | 5/2011 | |
| EP | 3 322 015 B1 | | 8/2015 | |
| EP | 3 474 345 B1 | | 3/2018 | |
| KR | 10-2019-0044180 A | | 4/2019 | |

OTHER PUBLICATIONS

EP Search Report.

* cited by examiner

*Primary Examiner* — Muhammad S Siddiquee
(74) *Attorney, Agent, or Firm* — MORGAN, LEWIS & BOCKIUS LLP

(57) ABSTRACT

A battery module includes: a plurality of battery cells disposed in a set direction inside a module housing; a first coolant inlet formed at a first side of the module housing; at least one cooling flow path fluidly connected to the first coolant inlet and formed between the plurality of battery cells adjacent to each other; a first coolant outlet formed at a second side of the module housing and fluidly connected to the first coolant inlet; a second coolant inlet formed at the second side of the module housing; and a second coolant outlet fluidly connected to the at least one cooling flow path and the second coolant inlet and formed at the first side of the module housing.

16 Claims, 8 Drawing Sheets

BATTERY MODULE, BATTERY PACK INCLUDING BATTERY MODULE, AND VEHICLE INCLUDING BATTERY PACK

CROSS-REFERENCE TO RELATED APPLICATION

The present application claims priority to Korean Patent Application No. 10-2022-0086121 filed on Jul. 13, 2022, the entire contents of which is incorporated herein for all purposes by this reference.

BACKGROUND OF THE PRESENT DISCLOSURE

Field of the Present Disclosure

The present disclosure relates to a battery module, a battery pack including the battery module, and a vehicle including the battery pack, and more particularly, to a battery module for cooling a battery cell and a battery module, a battery pack including the battery module, and a vehicle including the battery pack.

Description of Related Art

Secondary batteries having high application easiness according to products and electrical characteristics of high energy density are widely used in electric vehicles, hybrid vehicles, and the like driven by electric driving sources, as well as portable devices. These secondary batteries are attracting attention as a new energy source for improving eco-friendliness and energy efficiency in that the secondary batteries do not generate any by-products due to the use of energy as well as the primary advantage of dramatically reducing the use of fossil fuels.

The secondary batteries that are currently widely used include lithium ion batteries, lithium polymer batteries, nickel cadmium batteries, nickel hydrogen batteries, nickel zinc batteries, and the like. An operating voltage of a unit secondary battery cell, that is, a unit battery cell, is about 2.5V to 4.6V. Accordingly, when a higher output voltage than the operating voltage is required, a plurality of battery cells is connected in series to form a battery pack. Furthermore, a plurality of battery cells may be connected in parallel to form a battery pack according to the charge and discharge capacity required for the battery pack. Accordingly, the number of battery cells included in the battery pack may be variously set according to a required output voltage or charge and discharge capacity.

On the other hand, when a battery pack is configured by connecting a plurality of battery cells in series/parallel, a method of configuring first a battery module consisting of at least one battery cell and then configuring a battery pack by adding other components using such at least one battery module is common.

Because a battery pack including a multi-module structure is manufactured in a form in which a plurality of secondary batteries is concentrated in a narrow space, it is important to easily discharge heat generated from each secondary battery. Because the charging or discharging process of the secondary battery is implemented by an electrochemical reaction, when the heat of the battery module generated during the charging/discharging process is not effectively removed, heat accumulation occurs, and as a result, deterioration of the battery module is accelerated, and in some cases, ignition or explosion may occur.

Therefore, a high-output and large-capacity battery module and a battery pack provided with the high-output and large-capacity battery module must necessarily have a cooling device for cooling the battery cells provided therein.

A battery module in the related art generally adopts a cooling structure that emits heat by contacting with a thermal interface material (TIM) between battery cells and a heat sink for the cooling.

However, in the cooling structure generally, there is a problem in that it is difficult to increase the performance of a battery module and a battery pack, and furthermore, an electric vehicle including the battery modules or the battery pack due to low cooling performance.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery module configured for dissipating heat generated in a battery cell, a battery pack including the battery module, and a vehicle including the battery pack.

Various aspects of the present disclosure are directed to providing a battery module, including: a plurality of battery cells disposed in a set direction inside a module housing; a first coolant inlet formed at a first side of the module housing; at least one cooling flow path fluidly connected to the first coolant inlet and formed between the plurality of battery cells adjacent to each other; a first coolant outlet formed at a second side of the module housing and fluidly connected to the first coolant inlet; a second coolant inlet formed at the second side of the module housing; and a second coolant outlet fluidly connected to the at least one cooling flow path and the second coolant inlet and formed at the first side of the module housing.

The battery module may further include an inflow flow path fluidly connected to the first coolant inlet and the at least one cooling flow path between the coolant inlet and the at least one cooling flow path.

The inflow flow path may be located in an upper portion of the plurality of battery cells.

The battery module may further include a baffle plate disposed between the inflow flow path and the at least one cooling flow path.

The battery module may further include a discharge flow path fluidly connected to the at least one cooling flow path and the second coolant outlet between the at least one cooling flow path and the second coolant outlet.

The discharge flow path may be located in a lower portion of the battery cell.

Various aspects of the present disclosure are directed to providing a battery pack, including: a pack housing formed with a coolant inflow port through which a coolant is introduced and a coolant discharge port through which the coolant is discharged; and a plurality of battery modules disposed in a set direction inside the pack housing and including a plurality of battery cells disposed in a set direction inside a module housing, in which the battery module includes: a first coolant inlet formed at a first side of the module housing; at least one cooling flow path fluidly connected to the first coolant inlet and formed between the plurality of battery cells adjacent to each other; a first coolant outlet formed at a second side of the module housing and fluidly connected to the first coolant inlet; a second coolant inlet formed at the second side of the module housing; and a second coolant outlet fluidly connected to the at least one cooling flow path and the second coolant inlet and formed at the first side of the module housing, and the coolant inflow port is fluidly connected to the first coolant inlet of the module housing, the coolant discharge port is fluidly connected to the second coolant outlet of the module housing, the first coolant outlet of the module housing is fluidly connected to the first coolant inlet of the adjacent battery module, and the second coolant inlet of the module housing is fluidly connected to the second coolant outlet of the adjacent battery module.

The battery pack may further include an inflow flow path fluidly connected to the first coolant inlet and the at least one cooling flow path between the coolant inlet and the at least one cooling flow path.

The inflow flow path may be located in an upper portion of the battery cell.

The battery pack may further include a baffle plate disposed between the inflow flow path and the at least one cooling flow path of the battery module.

As the battery modules are located farther from the coolant inflow port, the total area of a communication hole formed in the baffle plate of the battery module may increase.

The battery pack may further include a discharge flow path fluidly connected to the at least one cooling flow path and the second coolant outlet of the module housing.

The discharge flow path may be located in a lower portion of the battery cell.

Various aspects of the present disclosure are directed to providing a vehicle including the foregoing battery pack.

According to the battery module, the battery pack including the battery module, and the vehicle including the battery pack according to the exemplary embodiment of the present disclosure as described above, it is possible to rapidly dissipate the heat generated in the battery cells through the coolant by rapidly dissipating the heat generated in the battery cells.

Furthermore, by rapidly cooling the battery cells, it is possible to improve the durability performance of the battery and prevent a decrease in the output of the battery due to overheating of the battery cells.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
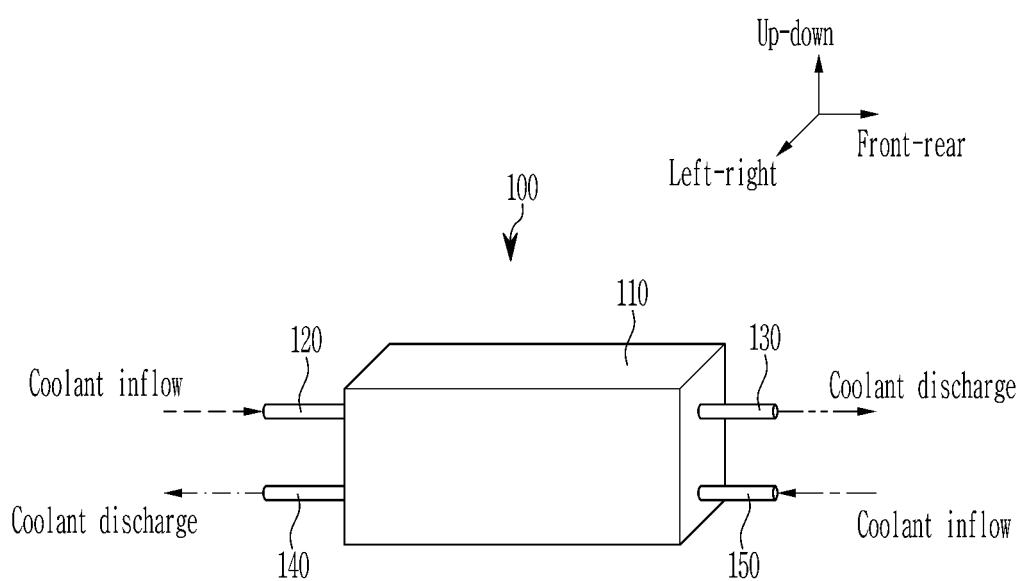
FIG. 1 is a perspective view exemplarily illustrating a configuration of a battery module according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are illustrated. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

Furthermore, the size and thickness of each configuration shown in the drawings are arbitrarily shown for understanding and ease of description, but the present disclosure is not limited thereto, and the thickness of layers, films, panels, regions, etc., are exaggerated for clarity.

Suffixes, "module" and/or "unit" for a constituent element used for the description below are provided or mixed in consideration of only easiness of the writing of the specification, and the suffix itself does not have a discriminated meaning or role.

Furthermore, in describing the exemplary embodiment included in the present disclosure, when it is determined that detailed description relating to well-known functions or configurations may make the subject matter of the exemplary embodiment included in the present disclosure unnecessarily ambiguous, the detailed description will be omitted.

Furthermore, the accompanying drawings are provided for helping to easily understand exemplary embodiments included in the present specification, and the technical spirit included in the present specification is not limited by the accompanying drawings, and it will be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms.

In the description below, expressions described in the singular form may be construed in the singular or plural unless an explicit expression such as "one" or "single" is used.

The terms are used only to discriminate one constituent element from another constituent element.

It should be understood that when one constituent element is referred to as being "coupled to" or "connected to" another constituent element, one constituent element may be directly coupled to or connected to the other constituent element, but intervening elements may also be present.

By contrast, when one constituent element is referred to as being "directly coupled to" or "directly connected to" another constituent element, it should be understood that there are no intervening elements.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Hereinafter, a battery module according to various exemplary embodiments of the present disclosure, a battery pack including the battery module, and a vehicle including the battery pack will be described in detail with reference to the accompanying drawings.

First, a structure of a battery module according to various exemplary embodiments of the present disclosure will be described in detail with reference to the accompanying drawings.

Figure 2:
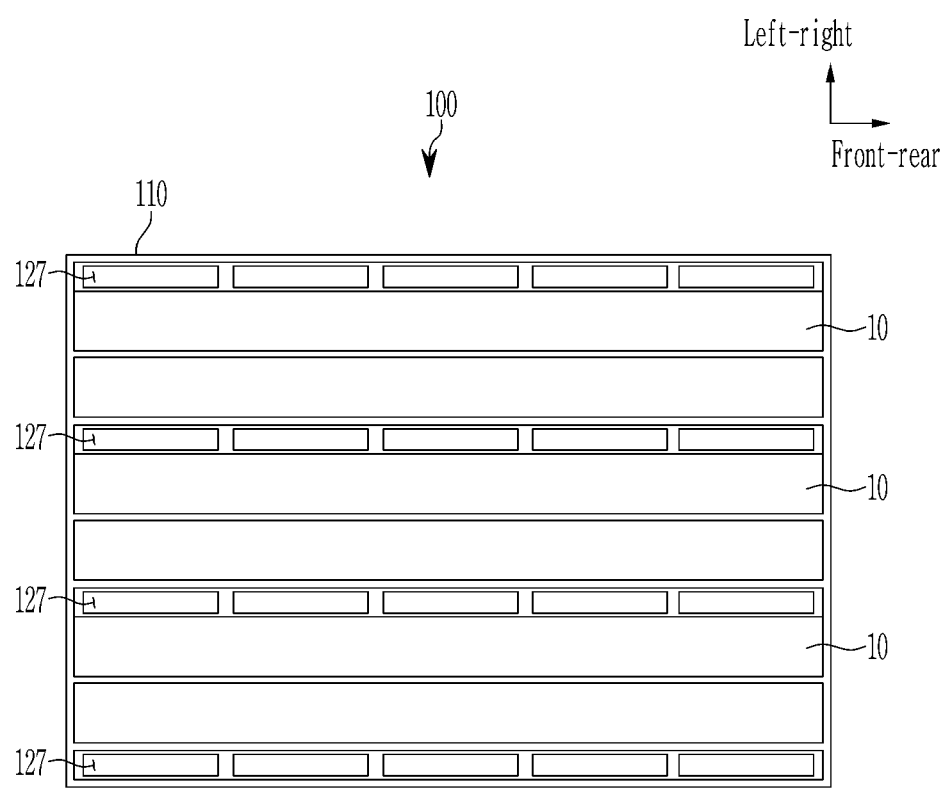
FIG. 2 is a top plan view exemplarily illustrating a configuration of a battery module according to various exemplary embodiments of the present disclosure.
Figure 3:
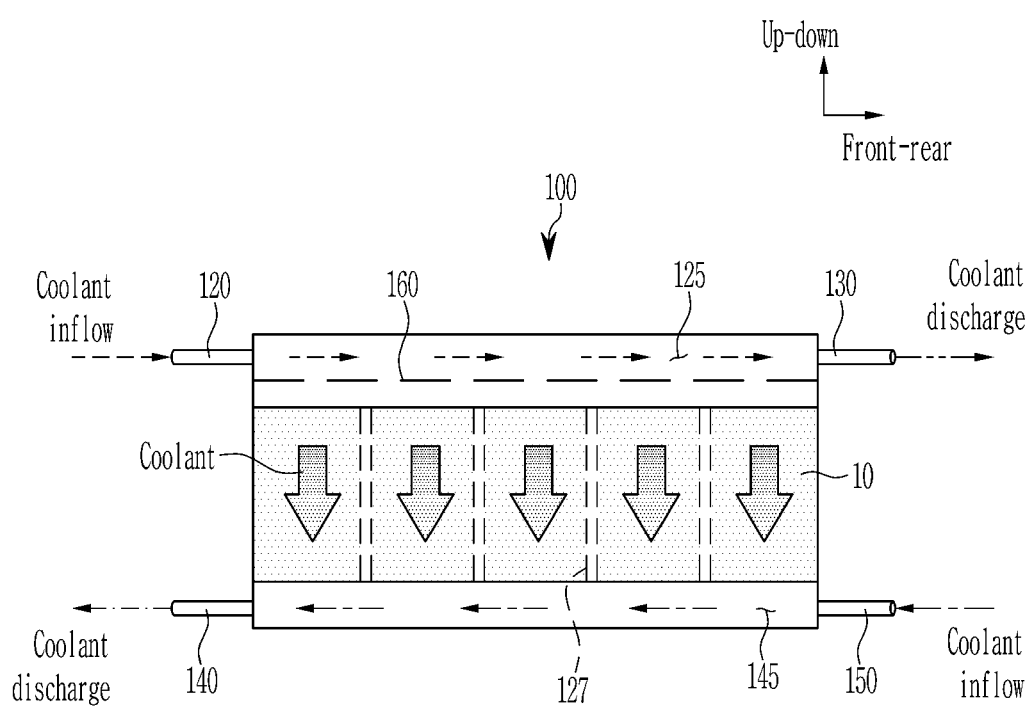
FIG. 3 is a conceptual diagram illustrating a flow of coolant in the battery module according to the exemplary embodiment of the present disclosure.

FIG. 1 is a perspective view exemplarily illustrating a configuration of a battery module according to various exemplary embodiments of the present disclosure. FIG. 2 is a top plan view exemplarily illustrating a configuration of a battery module according to various exemplary embodiments of the present disclosure. FIG. 3 is a side view exemplarily illustrating a flow of coolant in the battery module 100 according to the exemplary embodiment of the present disclosure.

As illustrated in FIG. 1, FIG. 2, and FIG. 3, the battery module 100 according to the exemplary embodiment of the present disclosure may include a battery cell 10 and a module housing 110 in which the battery cell 10 is mounted.

A plurality of battery cells 10 may be provided in the module housing 110, and the plurality of battery cells 10 may be stacked on each other (or disposed on each other) and electrically connected to each other. The battery cell 10 may be a pouch type, a prismatic type, or a cylindrical type, but the scope of the present disclosure is not limited according to the type of the battery cell 10. In the exemplary embodiment of the present disclosure, the battery cell 10 will be referred to as an example of a prismatic type.

The module housing 110 accommodates a plurality of battery cells 10, and an accommodation space for accommodating the plurality of battery cells 10 is formed in the module housing 110. In the exemplary embodiment of the present disclosure, the case where the module housing 110 is formed in a hexahedral shape is referred to as an exemplary embodiment of the present disclosure, but the scope of the present disclosure is not limited thereto.

A first coolant inlet 120 through which coolant (cold coolant before heat exchange with the battery cell 10) is introduced is formed on one surface (for example, the front surface) of the module housing 110 of the battery module 100 and a first coolant outlet 130 through which coolant (cold coolant before heat exchange with the battery cell 10) is discharged is formed on the other surface (for example, the rear surface) of the module housing 110 of the battery module 100. That is, the first coolant inlet 120 and the first coolant outlet 130 are passages through which the cold coolant flows before heat exchange with the battery cell 10.

Furthermore, a second coolant inlet 150 through which the coolant (coolant heated by the heat exchange with the battery cell 10) is introduced is formed on the other surface (for example, the rear surface) of the module housing 110 of the battery module 100, and a second coolant outlet 140 through which the coolant (coolant heated by the heat exchange with the battery cell 10) is discharged is formed on the one surface (for example, the front surface) of the module housing 110 of the battery module 100. That is, the second coolant inlet 150 and the second coolant outlet 140 are passages through which the hot coolant that has exchanged heat with the battery cell 10 flows.

A cooling flow path 127 fluidly connected to the first coolant inlet 120 and the second coolant outlet 140 is formed between the plurality of battery cells 10. The first coolant inlet 120 and the cooling flow path 127 are fluidly connected, and the cooling flow path 127 and the second coolant outlet 140 are fluidly connected. In the instant case, the cooling flow path 127 is formed along the vertical direction (for example, gravity direction) of the battery module 100 (or the battery).

In the exemplary embodiment of the present disclosure, as illustrated in FIG. 1, FIG. 2, and FIG. 3, a plurality of battery cells 10 may be stacked in the left and right direction, and may be formed between the adjacent battery cells 10 and on the side surface of the outermost battery cell 10 along the stacking direction (for example, the left and right direction) of the battery cells 10.

An inflow flow path 125 fluidly connecting the first coolant inlet 120 and the cooling flow path 127, and the cooling flow path 127 and the first coolant outlet 130 is formed between the first coolant inlet 120 and the cooling flow path 127 (or between the cooling flow path 127 and the first coolant outlet 130), and a discharge flow path 145 fluidly connecting the cooling flow path 127 and the second coolant outlet 140, and the second coolant inlet 150 and the second coolant outlet 140 is formed between the cooling flow path 127 and the second coolant outlet 140, and between the second coolant inlet 150 and the second coolant outlet 140.

In the exemplary embodiment of the present disclosure, the inflow flow path 125 is formed on an upper portion of the plurality of battery cells 10 stacked along a set direction (for example, the left and right direction), and the discharge flow path 145 is formed in a lower portion of the plurality of battery cells 10 stacked in a set direction (for example, the left and right direction). In the exemplary embodiment of the present disclosure, the inflow flow path 125 and the cooling flow path 127 are formed to be perpendicular to each other, and the cooling flow path 127 and the discharge flow path 145 are formed to be perpendicular to each other.

That is, some coolant introduced through the first coolant inlet 120 is introduced into the plurality of cooling flow paths 127 through the inflow flow path 125, and the remaining coolant is discharged to the outside of the battery module 100 through the first coolant outlet 130. That is, the cold coolant which is not heat-exchanged with the battery cell 10 is introduced into the battery module 100 through the first coolant inlet 120, and the cold coolant which is not heat-exchanged with the battery cell 10 is discharged to the outside of the battery module 100 through the first coolant outlet 130.

Accordingly, the coolant that cools the battery cell 10 while passing through the cooling flow path 127 and the coolant introduced through the second coolant inlet 150 merge in the discharge flow path 145, and then discharged to the outside of the battery module 100 through the second coolant outlet 140. That is, the coolant heated by the heat exchange with the battery cell 10 is introduced into the battery module 100 through the first coolant inlet 120, and the coolant heated by the heat exchange with the battery cell 10 is discharged to the outside of the battery module 100 through the second coolant outlet 140.

Figure 4:
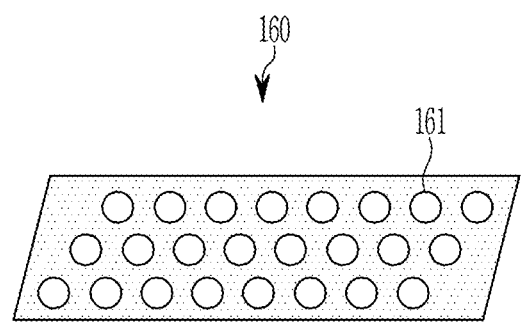
FIG. 4 is a perspective view exemplarily illustrating a configuration of a baffle plate according to the exemplary embodiment of the present disclosure.

Meanwhile, a baffle plate 160 is provided between the inflow flow path 125 and the cooling flow path 127. That is, the baffle plate 160 is disposed on the upper portion of the plurality of battery cells 10, or in other words, the upper portion of the plurality of cooling flow paths 127 (or the inflow flow path 125). As illustrated in FIG. 4, the baffle plate 160 is a plate in which a plurality of communication holes 161 is formed. By disposing the baffle plate 160 between the inflow flow path 125 and the plurality of cooling flow paths 127, the coolant flowing along the inflow flow path 125 may be evenly distributed to the plurality of cooling flow paths 127.

Next, a configuration of a battery pack 200 according to various exemplary embodiments of the present disclosure will be described in detail with reference to the accompanying drawings.

Figure 5:
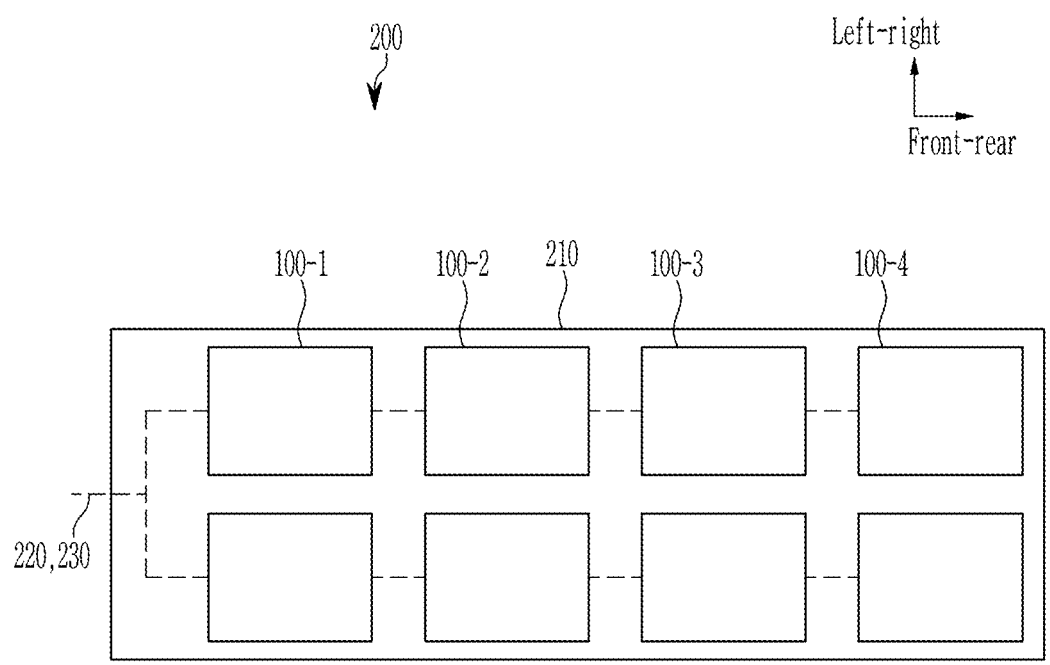
FIG. 5 and FIG. 6 are diagrams illustrating a configuration of a battery pack according to various exemplary embodiments of the present disclosure.
Figure 6:
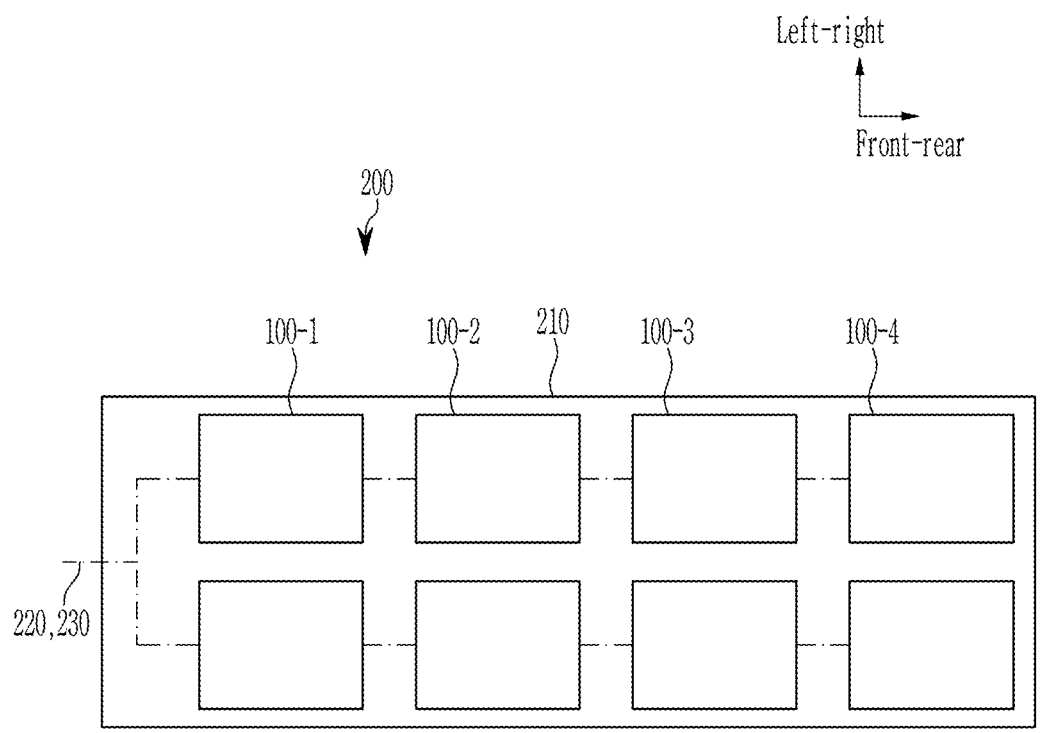
Figure 7:
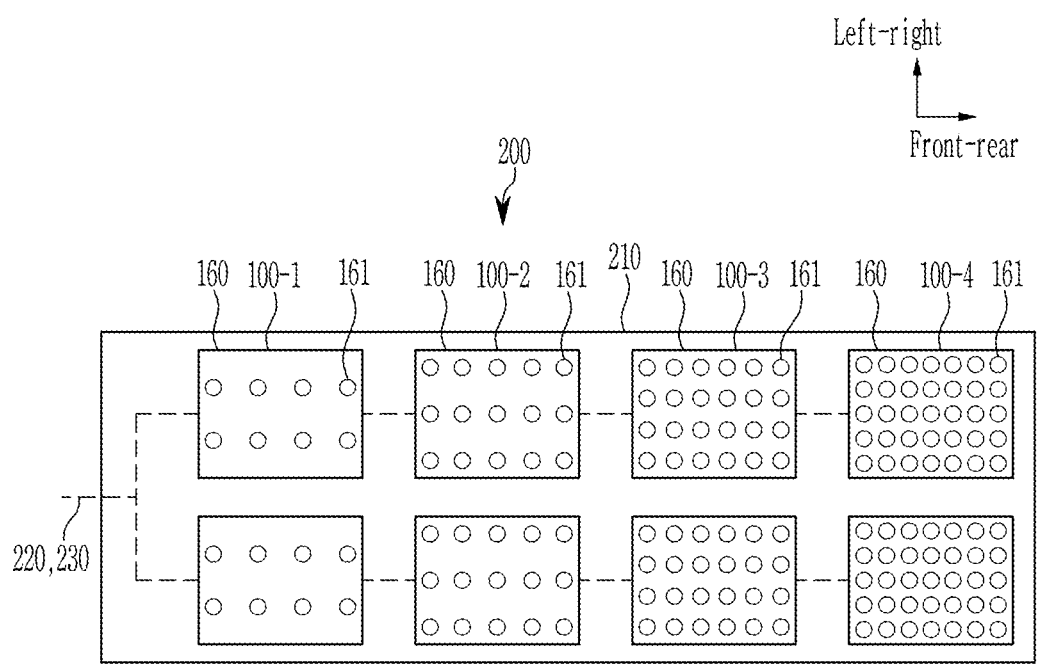
FIG. 7 is a conceptual diagram illustrating a configuration of a battery pack according various exemplary embodiments of the present disclosure.
Figure 8:
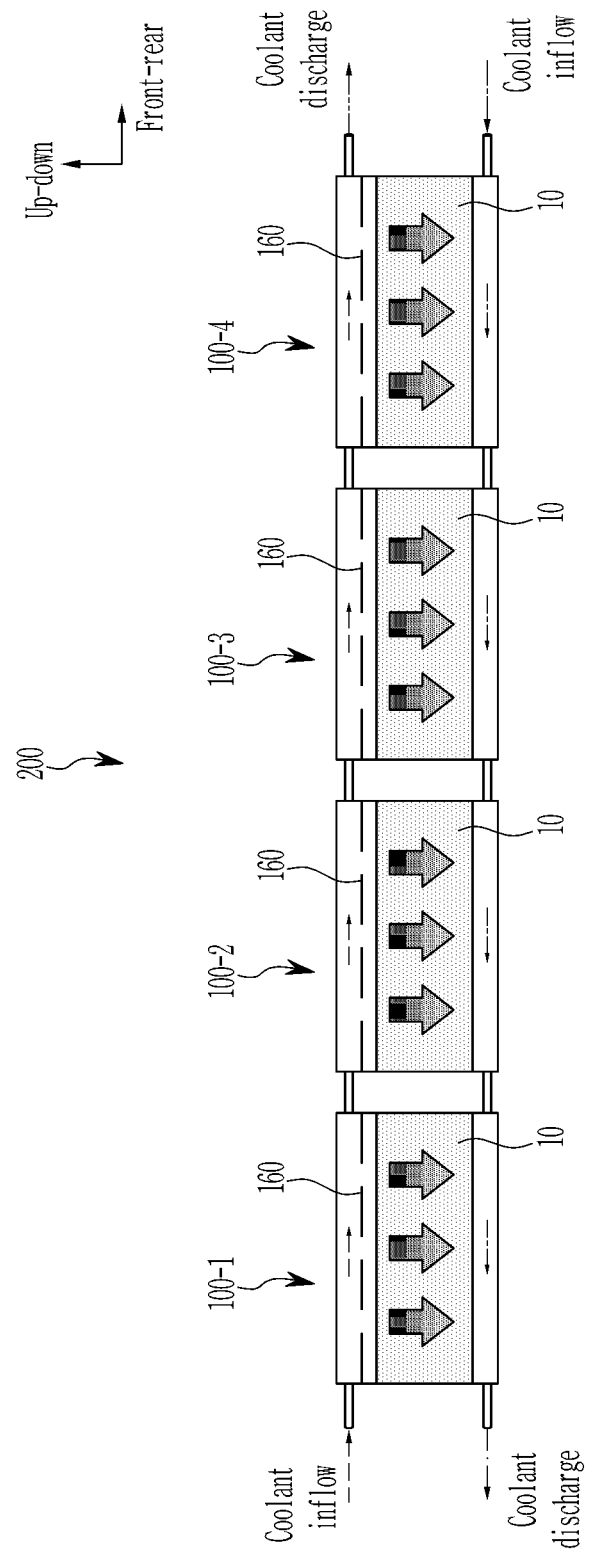
FIG. 8 is a conceptual diagram illustrating a flow of coolant in a battery pack according to various exemplary embodiments of the present disclosure.

FIG. 5 is a top view exemplarily illustrating a configuration of a battery pack 200 according to various exemplary embodiments of the present disclosure. FIG. 6 is a bottom view of the configuration of the battery pack 200 according to the exemplary embodiment of the present disclosure. FIG. 7 is a side view exemplarily illustrating the configuration of the battery pack 200 according the exemplary embodiment of the present disclosure.

As illustrated in FIG. 5, FIG. 6 and FIG. 7, the battery pack 200 according to the exemplary embodiment of the present disclosure includes at least one battery module 100 described above.

The battery pack 200 may include at least one battery module 100 and a pack housing 210 in which the battery module 100 is mounted.

A plurality of battery modules 100 may be provided inside the pack housing 210 of the battery pack 200, and the plurality of battery modules 100 may be stacked on each other (or disposed on each other) along a set direction to be electrically connected to each other. In the exemplary embodiment of the present disclosure, the plurality of battery modules 100 is disposed along the front and rear direction thereof.

The pack housing 210 accommodates a plurality of battery modules 100, and an accommodation space for accommodating the plurality of battery modules 100 is formed in the pack housing 210.

The pack housing 210 of the battery pack 200 is provided with a coolant inflow port 220 through which coolant is introduced, and a coolant discharge port 230 through which the coolant is discharged is formed in the pack housing 210 of the battery pack 200.

In the exemplary embodiment of the present disclosure, each of the coolant inflow port 220 and the coolant discharge port 230 may be formed on a same surface (for example, the front surface) of the pack housing 210 of the battery pack 200.

The coolant inflow port 220 is fluidly connected to the first coolant inlet 120 of any one battery module 100 (for example, the battery module 100 closest to the coolant inflow port 220) among the battery modules 100, and the coolant discharge port 230 may be fluidly connected to the second coolant outlet 140 of any one battery module 100 (for example, the battery module 100 closest to the coolant discharge port 230) among the battery modules 100.

Furthermore, the first coolant outlet 130 of the battery module 100 is fluidly connected to the first coolant inlet 120 of the adjacent battery module 100.

Furthermore, the second coolant inlet 150 of the battery module 100 is fluidly connected to the second coolant outlet 140 of the adjacent battery module 100.

If necessary, when the plurality of battery modules 100 is disposed inside the battery pack 200, in the case of the battery module 100 located farthest from the coolant inflow port 220, the first coolant outlet 130 and the second coolant inlet 150 are not formed.

On the other hand, in the exemplary embodiment of the present disclosure, when the plurality of battery modules 100 is disposed inside the battery pack 200, the total area of a communication hole 161 of the baffle plate 160 of the battery module 100 may increase as the battery module 100 is located farther from the coolant inflow port 220 of the battery pack 200 (refer to FIG. 7). Accordingly, as the battery module 100 is located farther from the coolant inflow port 220 of the battery pack 200, the total area of a communication hole 161 of the baffle plate 160 of the battery module 100 increases, so that the flow rate of the coolant supplied to each battery module 100 may be uniformly distributed.

The battery pack 200 according to the exemplary embodiment of the present disclosure described above may be mounted on an electric vehicle or a hybrid vehicle and used as a driving source of the electric vehicle or the hybrid vehicle.

Hereinafter, the cooling process of the battery module 100 and the battery pack 200 according to the exemplary embodiment of the present disclosure as described above will be described in detail.

In the exemplary embodiment of the present disclosure, as illustrated in FIGS. 5 to 8, four battery modules 100 may be disposed in series inside the battery pack 200, and the four battery modules 100 disposed in series may be disposed in parallel. That is, a case in which a set of four battery modules 100 disposed in series inside the battery pack 200 are disposed in parallel with each other will be referred to as an example.

In the exemplary embodiment of the present disclosure, the battery module 100 closest to the coolant inflow port 220 (or the coolant discharge port 230) of the battery pack 200 is referred to as a first battery module 100-1, a battery module 100 adjacent to the first battery module 100-1 along the arrangement direction of the battery module is referred to as a second battery module 100-2, a battery module 100 adjacent to the second battery module 100-2 along the arrangement direction of the battery module 100 is referred to as a third battery module 100-3, and a battery module 100 located farthest from the coolant inflow port 220 (or the coolant discharge port 230) of the battery pack 200 is referred to as a fourth battery module 100-4 (or the outermost battery module 100-4).

The coolant introduced through the coolant inflow port 220 of the battery pack 200 is introduced into the inflow flow path 125 of the first battery module 100-1 through the first coolant inlet 120 of the first battery module 100-1 which is fluidly connected to the coolant inflow port 220 of the battery pack 200. Some coolant introduced into the inflow flow path 125 of the first battery module 100-1 is introduced into the cooling flow path 127 through the communication hole 161 of the baffle plate 160, and the coolant flowing along the cooling flow path 127 cools the battery cell 10 through heat exchange with the battery cell 10 and then is introduced into the discharge flow path 145. Thereafter, the coolant flowing through the discharge flow path 145 passes through the second coolant outlet 140 of the first battery module 100-1 and the coolant discharge port 230 of the battery pack 200 and is discharged to the outside of the battery pack 200.

The remaining coolant introduced into the inflow flow path 125 of the first battery module 100-1 is introduced into the inflow flow path 125 of the second battery module 100-2 through the first coolant inlet 120 of the adjacent second battery module 100-2 which is fluidly connected to the first coolant outlet 130, and a portion of the coolant flowing through the inflow flow path 125 of the second battery module 100-2 is introduced into the cooling flow path 127 of the second battery module 100-2 through the communication hole 161 of the baffle plate 160. The coolant flowing along the cooling flow path 127 of the second battery module 100-2 cools the battery cell 10 through heat exchange with the battery cell 10, and then is introduced into the discharge flow path 145. Thereafter, the coolant flowing through the discharge flow path 145 is introduced into the discharge flow path 145 of the first battery module 100-1 through the second coolant inlet 150 of the first battery module 100-1 which is fluidly connected to the second coolant outlet 140. Thereafter, the coolant flowing through the discharge flow path 145 of the first battery module 100-1 is discharged to the outside of the battery pack 200 through the second coolant outlet 140 of the battery module 100 and the coolant discharge port 230 of the battery pack 200.

By a same manner as described above, the coolant (for example, cold coolant which is not heat-exchanged with the battery cell 10) introduced into the battery pack 200 through the coolant inflow port 220 is sequentially supplied from the first battery module 100-1 closest to the coolant inflow port 220 to the outermost battery module 100-4 farthest from the coolant inflow port 220.

Furthermore, the coolant heated by the heat exchange with the battery cells 10 of each battery module 100 is supplied from the outermost battery module 100-4 farthest from the coolant discharge port 230 to the first battery module 100-1 closest to the coolant discharge port 230 and then is discharged to the outside of the battery pack 200 through the battery discharge port.

According to the battery module 100, the battery pack 200, and the vehicle according to the exemplary embodiment of the present disclosure as described above, it is possible to improve the durability performance of the battery and to prevent a decrease in output of the battery due to overheating of the battery cell 10 by rapidly cooling the high-temperature heat generated in the battery cells 10 forming the battery module 100 through coolant.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery module, comprising:
    a plurality of battery cells disposed in a set direction inside a module housing;
    a first coolant inlet formed at a first side of the module housing;
    at least one cooling flow path fluidly connected to the first coolant inlet and formed between the plurality of battery cells adjacent to each other;
    a first coolant outlet formed at a second side of the module housing and fluidly connected to the first coolant inlet;
    a second coolant inlet formed at the second side of the module housing; and
    a second coolant outlet fluidly connected to the at least one cooling flow path and the second coolant inlet and formed at the first side of the module housing.

2. The battery module of claim 1, further including:
    an inflow flow path fluidly connected to the first coolant inlet and the at least one cooling flow path between the coolant inlet and the at least one cooling flow path.

3. The battery module of claim 2, wherein the inflow flow path is located in an upper portion of the plurality of battery cells.

4. The battery module of claim 2, further including:
    a baffle plate disposed between the inflow flow path and the at least one cooling flow path.

5. The battery module of claim 4, wherein the baffle plate includes a plurality of communication holes.

6. The battery module of claim 1, further including:
    a discharge flow path fluidly connected to the at least one cooling flow path and the second coolant outlet between the at least one cooling flow path and the second coolant outlet.

7. The battery module of claim 6, wherein the discharge flow path is located in a lower portion of the battery cell.

8. A battery pack, comprising:
    a pack housing including a coolant inflow port through which a coolant is introduced and a coolant discharge port through which the coolant is discharged; and
    a plurality of battery modules disposed in a set direction inside the pack housing and including a plurality of battery cells disposed in a set direction inside a module housing, wherein the battery module includes:
- a first coolant inlet formed at a first side of the module housing;
- at least one cooling flow path fluidly connected to the first coolant inlet and formed between the plurality of battery cells adjacent to each other;
- a first coolant outlet formed at a second side of the module housing and fluidly connected to the first coolant inlet;
- a second coolant inlet formed at the second side of the module housing; and
- a second coolant outlet fluidly connected to the at least one cooling flow path and the second coolant inlet and formed at the first side of the module housing, and wherein the coolant inflow port is fluidly connected to the first coolant inlet of the module housing, wherein the coolant discharge port is fluidly connected to the second coolant outlet of the module housing, wherein the first coolant outlet of the module housing is fluidly connected to the first coolant inlet of an adjacent battery module, and wherein the second coolant inlet of the module housing is fluidly connected to the second coolant outlet of the adjacent battery module.

9. The battery pack of claim 8, further including:
- an inflow flow path fluidly connected to the first coolant inlet and the at least one cooling flow path between the coolant inlet and the at least one cooling flow path.

10. The battery pack of claim 9, wherein the inflow flow path is located in an upper portion of each battery cell.

11. The battery pack of claim 8, further including:
- a baffle plate disposed between the inflow flow path and the at least one cooling flow path of each battery module.

12. The battery pack of claim 11, wherein the baffle plate of the battery includes a communication hole.

13. The battery pack of claim 12, wherein as the battery modules are located farther from the coolant inflow port, a total area of a communication hole formed in the baffle plate of each battery module increases.

14. The battery pack of claim 8, further including:
- a discharge flow path fluidly connected to the at least one cooling flow path and the second coolant outlet of the module housing.

15. The battery pack of claim 14, wherein the discharge flow path is located in a lower portion of each battery cell.

16. A vehicle including the battery pack of claim 8.

* * * * *